(12) United States Patent
Aoki et al.

(10) Patent No.: US 11,891,086 B2
(45) Date of Patent: Feb. 6, 2024

(54) VEHICLE CONTROL SYSTEM

(71) Applicant: Hitachi Astemo, Ltd., Hitachinaka (JP)

(72) Inventors: Naoto Aoki, Hitachinaka (JP); Akira Kuriyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 155 days.

(21) Appl. No.: 17/605,339

(22) PCT Filed: Apr. 28, 2020

(86) PCT No.: PCT/JP2020/018068
§ 371 (c)(1),
(2) Date: Oct. 21, 2021

(87) PCT Pub. No.: WO2020/230619
PCT Pub. Date: Nov. 19, 2020

(65) Prior Publication Data
US 2022/0227386 A1   Jul. 21, 2022

(30) Foreign Application Priority Data

May 13, 2019 (JP) .................................. 2019-090353

(51) Int. Cl.
*B60W 60/00* (2020.01)
*G06V 20/58* (2022.01)
(Continued)

(52) U.S. Cl.
CPC .......... *B60W 60/001* (2020.02); *B60W 40/04* (2013.01); *B60W 50/023* (2013.01);
(Continued)

(58) Field of Classification Search
CPC .. B60W 40/04; B60W 60/001; B60W 50/023; B60W 2050/0215;
(Continued)

(56) References Cited

U.S. PATENT DOCUMENTS 11,465,643 B2 * 10/2022 Iida .................. G01S 13/93
11,511,747 B2 * 11/2022 Gotoda .............. G01S 17/42
(Continued)

FOREIGN PATENT DOCUMENTS

JP  2010-249613 A  11/2010
JP  2016-223963 A  12/2016
(Continued)

OTHER PUBLICATIONS

International Search Report with English translation and Written Opinion issued in corresponding application No. PCT/JP2020/018068 dated Aug. 18, 2020.

*Primary Examiner* — Russell Frejd
*Assistant Examiner* — Brandon Z Willis
(74) *Attorney, Agent, or Firm* — Foley & Lardner LLP

(57) ABSTRACT

A vehicle control system is configured to group objects detected by a plurality of sensors. The vehicle control system includes an integration device that groups detection information from the plurality of sensors and outputs integrated detection information, and a vehicle control device that controls a vehicle on the basis of the integrated detection information. An arithmetic device of the information integration device stores first time-series information of the first detection information and second time-series information of the second detection information in a storage device, calculates a correction parameter of the first detection information by grouping the first time-series information and the second time-series information when the first sensor and the second sensor detect the same object, calculates correction information obtained by correcting the first detection information using the correction parameter, and outputs the integrated detection information by instantaneous value grouping using the correction information and the second detection information.

6 Claims, 12 Drawing Sheets

(51) Int. Cl.
*B60W 40/04* (2006.01)
*B60W 50/023* (2012.01)
*G01S 13/86* (2006.01)
*G01S 13/931* (2020.01)

(52) U.S. Cl.
CPC .......... *G01S 13/867* (2013.01); *G01S 13/931* (2013.01); *G06V 20/58* (2022.01); *B60W 2420/42* (2013.01); *B60W 2420/52* (2013.01); *B60W 2554/4041* (2020.02); *B60W 2556/20* (2020.02); *B60W 2556/25* (2020.02); *B60W 2556/30* (2020.02); *B60W 2556/35* (2020.02)

(58) Field of Classification Search
CPC ......... B60W 2420/42; B60W 2420/52; B60W 2420/403; B60W 2420/40; B60W 2554/4041; B60W 2554/20; B60W 2554/40; B60W 2556/25; B60W 2556/35; B60W 2556/20; B60W 2556/30; G06V 20/58; G06V 20/54; G06V 10/62; G06V 10/80; G06V 10/811; G01S 13/86; G01S 13/865; G01S 13/867; G01S 13/93; G01S 13/931; G01S 7/40
See application file for complete search history.

(56) References Cited

U.S. PATENT DOCUMENTS

| | | | |
|---|---|---|---|
| 2017/0262716 A1 | 9/2017 | Matsumoto | |
| 2019/0120955 A1 | 4/2019 | Zhong et al. | |
| 2020/0211219 A1* | 7/2020 | Yamazaki | G01S 17/87 |
| 2020/0319305 A1* | 10/2020 | Yeh | G01S 17/86 |

FOREIGN PATENT DOCUMENTS

| | | |
|---|---|---|
| JP | 2018-013855 A | 1/2018 |
| WO | WO-2016/027652 A1 | 2/2016 |
| WO | WO-2019/039279 A1 | 2/2019 |

\* cited by examiner

VEHICLE CONTROL SYSTEM

TECHNICAL FIELD

The present disclosure relates to a vehicle control system.

BACKGROUND ART

In the related art, an invention related to a calibration device used for a mining work machine is known (refer to PTL 1 below). PTL 1 discloses a calibration device having the following configuration. The calibration device includes: "a positional deviation determination permission unit 114 that determines whether or not an obstacle is an obstacle suitable for detecting a positional deviation between a first measurement device 11 and a second measurement device 12 on the basis of a geometric shape measured by the first measurement device 11; and an inter-sensor calibration unit 117 that detects a positional deviation amount between the first measurement device 11 and the second measurement device 12 on the basis of a detection position by the first measurement device 11 with respect to the obstacle determined to be an obstacle suitable for detecting a positional deviation by the positional deviation determination permission unit 114 and a detection position by the second measurement device 12 with respect to the obstacle." (refer to abstract section of the same document).

In addition, an invention related to an action recognition device and an action recognition method is known (refer to PTL 2 below). An action recognition device 30 of PTL 2 includes: "a storage unit 32 that stores training data for a person p, training data being a set of pairs (Xp, Yp) of sensor data Xp detected by a first sensor 10 and sensor data Yp detected by a second sensor 20; an estimation unit 332 that calculates an estimated value Ye (Xp') of sensor data Yp' for arbitrary sensor data Xp' on the basis of the training data; a sensor data collation unit 333 that calculates a similarity Cij between the estimated value Ye(Xp') and the collected sensor data Yj and calculates a collation score Pij indicating a degree of possibility that a person i and a person j are the same person on the basis of temporal transition of the calculated similarity Cij; and a person determination unit 334 that determines whether or not the person i and the person j are the same person on the basis of a value of the collation score Pij" (refer to abstract section of the same document).

CITATION LIST

Patent Literature

PTL 1: JP 2016-223963 A
PTL 2: JP 2018-13855 A

SUMMARY OF INVENTION

Technical Problem

The conventional obstacle detection device described in PTL 1 determines that two obstacles are the same obstacle when the obstacle position detected by the first measurement device and the obstacle position detected by the second measurement device overlap at each time of t, t+1, t+2, ... , and t+n (refer to paragraph 0034 or the like of PTL 1). However, as in the conventional obstacle detection device, in instantaneous value grouping of determining whether or not the obstacles detected by the plurality of measurement devices are the same at each time, there is a possibility that an error is included in the determination result, and it is difficult to perform the grouping with high accuracy.

Meanwhile, in the conventional action recognition device described in PTL2, the estimation unit calculates the collation score indicating the degree of possibility that the persons detected by the plurality of sensors are the same person on the basis of temporal transition of the similarity between the plurality of pieces of sensor data. As described above, according to the time-series grouping based on the temporal transition of the plurality of sensor data, it is possible to perform grouping with higher accuracy than the instantaneous value grouping. However, since the time-series grouping requires time-series data, it takes a longer time than the instantaneous value grouping that does not require the time-series data.

The present disclosure provides a vehicle control system capable of grouping a plurality of detection results of the same object detected by a plurality of sensors with high accuracy in a short time.

Solution to Problem

According to an aspect of the present disclosure, there is provided a vehicle control system including: a first sensor and a second sensor that detect an object around a vehicle; an information integration device that groups first detection information and second detection information that are detection results of the first sensor and the second sensor that detect a same object and outputs integrated detection information; and a vehicle control device that controls the vehicle based on the integrated detection information, in which the information integration device includes an arithmetic device and a storage device, and the arithmetic device stores first time-series information that is time-series information of the first detection information and second time-series information that is time-series information of the second detection information in the storage device, groups the first time-series information and the second time-series information when the first sensor and the second sensor detect the same object to calculate a correction parameter of the first detection information, calculates correction information obtained by correcting the first detection information using the correction parameter, and outputs the integrated detection information by instantaneous value grouping using the correction information and the second detection information.

Advantageous Effects of Invention

According to the above aspect of the present disclosure, it is possible to provide a vehicle control system capable of grouping a plurality of detection results of the same object detected by a plurality of sensors with high accuracy in a short time.

DESCRIPTION OF EMBODIMENTS

Hereinafter, embodiments of a vehicle control system of the present disclosure will be described with reference to the drawings.

First Embodiment

Hereinafter, first, a configuration of a vehicle control system 100 according to a first embodiment of the present disclosure will be described with reference to FIGS. 1 and 2, and next, a flow of detection information integration S200 by an information integration device 120 will be described with reference to FIG. 3.

(Vehicle Control System)

Figure 1:
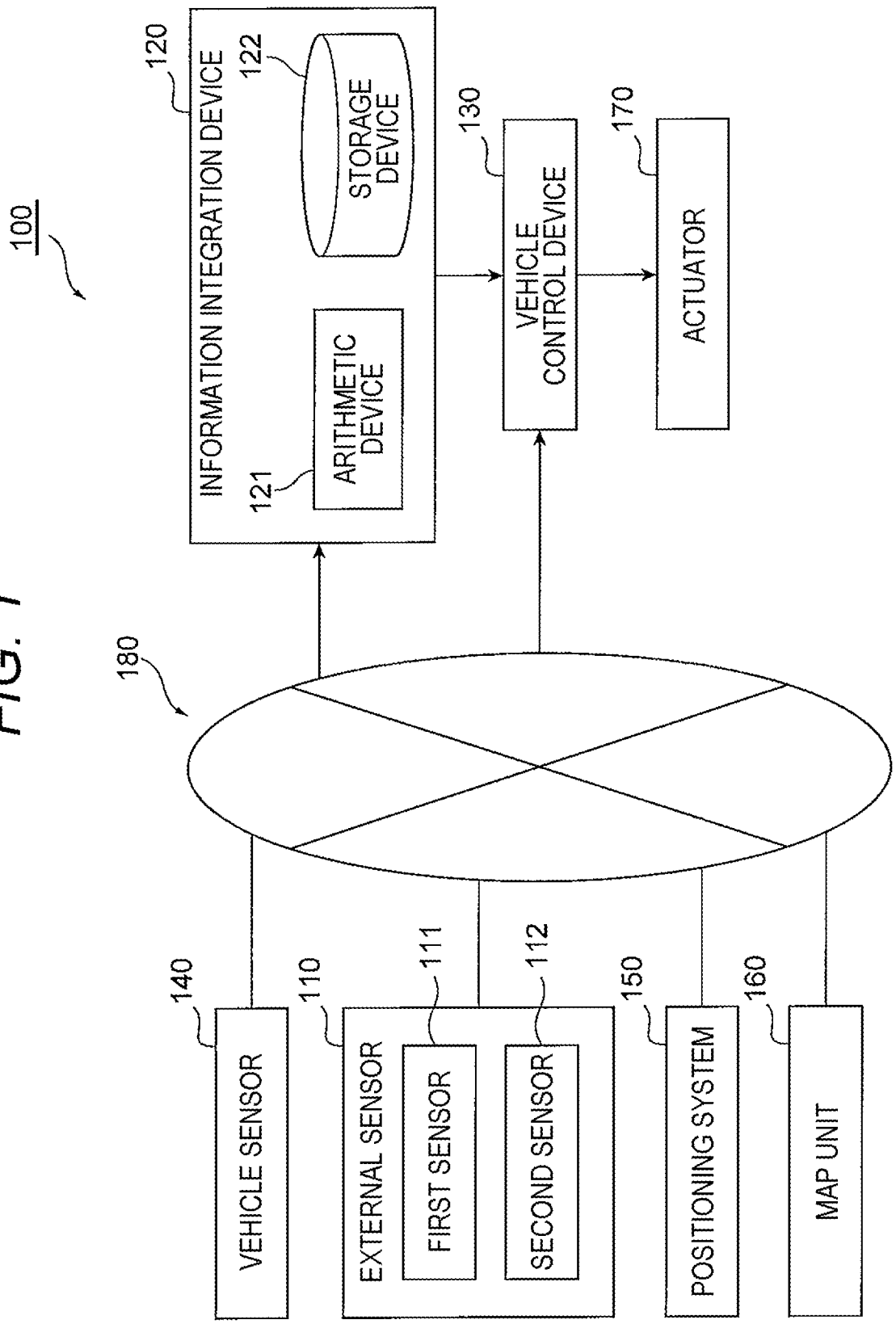
FIG. 1 is a block diagram illustrating a configuration of a vehicle control system according to a first embodiment of the present disclosure.

FIG. 1 is a block diagram illustrating a configuration example of the vehicle control system 100 of the present embodiment. The vehicle control system 100 is mounted on a vehicle such as an automobile, for example, and constitutes an advanced driving assistance system (ADAS) or an automatic driving (AD) system of the vehicle. The vehicle control system 100 includes, for example, an external sensor 110, an information integration device 120, and a vehicle control device 130. Furthermore, the vehicle control system 100 may include, for example, a vehicle sensor 140, a positioning system 150, a map unit 160, and an actuator 170.

The external sensor 110 is a sensor for detecting an object around the vehicle on which the vehicle control system 100 is mounted. The external sensor 110 detects, for example, a relative position and a relative speed of an object around the vehicle on which the vehicle control system 100 is mounted, a shape and a type of the object, and the like. The objects around the vehicle include, for example, other vehicles, pedestrians, roads, sidewalks, road markings such as white lines, signs, signals, curbs, guardrails, buildings, and other obstacles.

The external sensor 110 includes, for example, two sensors of a first sensor 111 and a second sensor 112. The first sensor 111 and the second sensor 112 are, for example, different types of sensors having different object detection principles. Furthermore, the external sensor 110 may include three or more different types of sensors, or may include a plurality of sensors of the same type. The external sensor 110 is data-communicably connected to the information integration device 120 and the vehicle control device 130 via a communication network 180 such as a controller area network (CAN), Ethernet (registered trademark), or wireless communication.

Examples of the plurality of sensors included in the external sensor 110 include a millimeter wave radar device, an imaging device including a monocular camera or a stereo camera, an ultrasonic sonar, a laser radar device, and the like. The first sensor 111 is, for example, a sensor that detects a three-dimensional shape of an object around the vehicle and a distance to the object. Specifically, first sensor 111 is, for example, an imaging device. The second sensor 112 is, for example, a sensor that measures a distance to an object around the vehicle. Specifically, the second sensor 112 is, for example, a distance measuring device such as a millimeter wave radar device or a laser radar device.

The information integration device 120 groups detection results of several sensors that have detected the same object among a plurality of sensors included in the external sensor 110, and outputs integrated detection information in which these detection results are integrated. More specifically, for example, the information integration device 120 groups first detection information and second detection information that are the detection results of the first sensor 111 and the second sensor 112 that have detected the same object, and outputs integrated detection information. The information integration device 120 is data-communicably connected to, for example, the vehicle sensor 140, the external sensor 110, the positioning system 150, the map unit 160, and the vehicle control device 130 via the communication network 180.

The information integration device 120 includes, for example, an arithmetic device 121 and a storage device 122. The arithmetic device 121 is, for example, one or more central processing units (CPU). The storage device 122 includes, for example, one or a plurality of main storage devices and auxiliary storage devices. The storage device 122 can be configured by, for example, a hard disk or a memory. Furthermore, the information integration device 120 includes, for example, a terminal unit that inputs and outputs a signal and an input device for inputting a setting value and the like.

Figure 2:
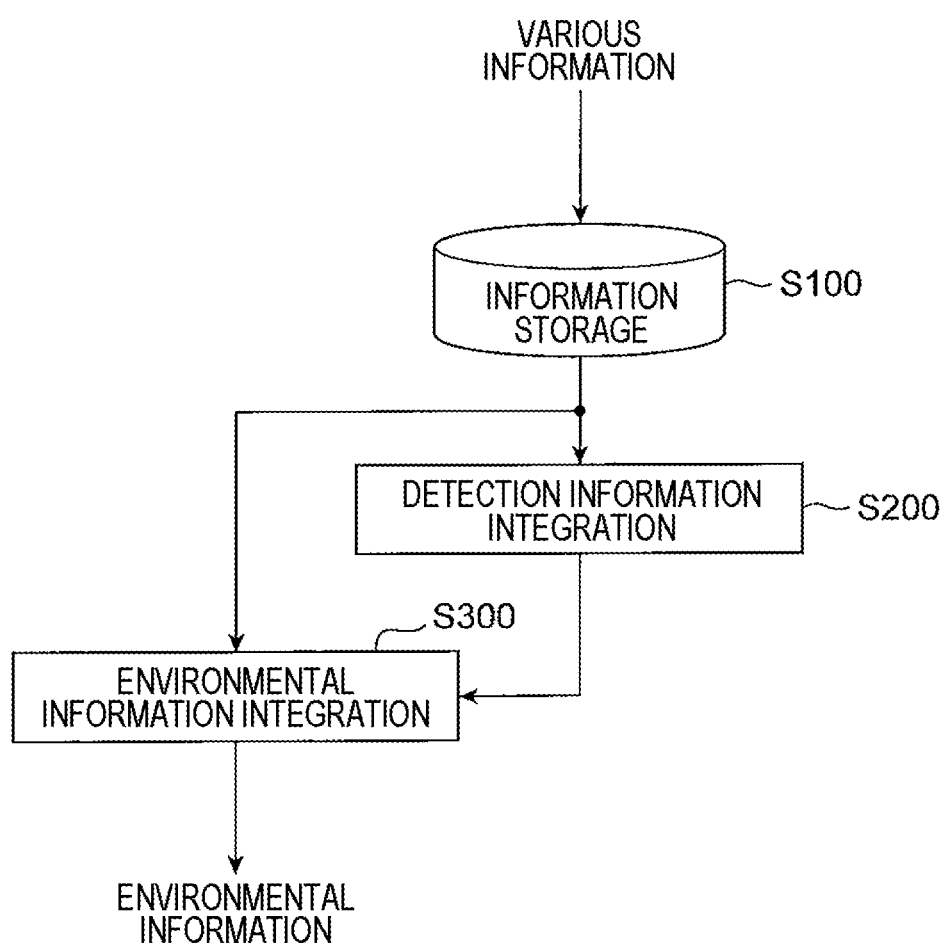
FIG. 2 is a flowchart illustrating processing of an information integration device constituting the vehicle control system of FIG. 1.

FIG. 2 is a flowchart illustrating an example of processing of the information integration device 120. The arithmetic device 121 of the information integration device 120 first acquires various types of information via the communication network 180 in information storage S100 and stores the information in the storage device 122. As a result, the storage device 122 stores various types of information such as behavior information and position information of the vehicle on which the vehicle control system 100 is mounted, and detection information of objects around the vehicle, road information, and map information.

In detection information integration S200, the arithmetic device 121 outputs integrated detection information obtained by integrating a plurality of pieces of detection information of the same object among the pieces of detection information of the plurality of sensors of the external sensor 110 stored in the storage device 122. Here, the plurality of pieces of integrated detection information includes, for example, first detection information and second detection information which are detection results of objects by the first sensor 111 and the second sensor 112.

In environmental information integration S300, the arithmetic device 121 integrates the above-described integrated detection information with various types of information acquired from the storage device 122, for example, the behavior information and position information of the vehicle and the road information and map information around the vehicle, and outputs environmental information. The output environment information is input to the vehicle control device 130 illustrated in FIG. 1.

The vehicle control device 130 controls the vehicle on the basis of the integrated detection information output from the information integration device 120. More specifically, the vehicle control device 130 controls the vehicle on the basis of the environment information around the vehicle in which the integrated detection information of the object and various other information are integrated. The vehicle control device 130 is data-communicably connected to, for example, the vehicle sensor 140, the external sensor 110, the positioning system 150, the map unit 160, the information integration device 120, and the actuator 170.

The vehicle control device 130 generates a travel plan including a travel route, speed, acceleration, and the like of the vehicle equipped with the vehicle control system 100 on the basis of, for example, outputs from the vehicle sensor 140, the external sensor 110, the positioning system 150, the map unit 160, and the information integration device 120. The vehicle control device 130 realizes the ADAS and AD by controlling the actuator 170 on the basis of the generated travel plan.

The vehicle sensor 140 is a sensor that measures a speed, an acceleration, a steering angle, a yaw rate, and the like of the vehicle on which the vehicle control system 100 is mounted. Specifically, the vehicle sensor 140 includes, for example, a gyro sensor, a wheel speed sensor, a steering angle sensor, an acceleration sensor, a brake sensor, an accelerator sensor, a shift sensor, and the like. The vehicle sensor 140 is data-communicably connected to the information integration device 120 and the vehicle control device 130 via, for example, the communication network 180.

The positioning system 150 measures the position of the vehicle on which the vehicle control system 100 is mounted. As the positioning system 150, for example, a satellite positioning system such as a global navigation satellite system (GNSS) or a global positioning system (GPS) can be used. The positioning system 150 is data-communicably connected to the information integration device 120, the vehicle control device 130, and the map unit 160 via, for example, the communication network 180.

The map unit 160 includes, for example, an arithmetic device and a storage device, acquires the position of the vehicle on which the vehicle control system 100 is mounted from the positioning system 150, and selects and outputs map information around the vehicle. The map unit 160 is data-communicably connected to the information integration device 120, the vehicle control device 130, and the positioning system 150 via, for example, the communication network 180.

The actuator 170 causes the vehicle on which the vehicle control system 100 is mounted to travel in accordance with, for example, command information from the vehicle control device 130. Specifically, the actuator 170 realizes the ADAS and AD of the vehicle by operating an accelerator, a brake, a transmission, a steering, a direction indicator, and the like of the vehicle in accordance with the command information from the vehicle control device 130, for example.

(Detection Information Integration)

Next, the detection information integration S200 included in the processing by the information integration device 120 illustrated in FIG. 1 will be described in detail. FIG. 3 is a flowchart illustrating details of the detection information integration S200 included in the processing of the information integration device 120 illustrated in FIG. 2.

The detection information integration S200 includes, for example, correction S201, instantaneous value grouping S202, integration update S203, time-series conversion S204 of the integrated detection information, storage S205 of integrated time-series information, instantaneous value conversion S206 of the integrated time-series information, and prediction update S207 of the integrated detection information. The detection information integration S200 includes, for example, time-series conversion S208 of detection information, storage S209 of the time-series information, calibration determination S210, calibration S220, and storage S211 of correction parameter storage.

First, in the correction S201, the arithmetic device 121 of the information integration device 120 corrects detection information of the specific sensor among the plurality of pieces of detection information which are the detection results of the object by the plurality of sensors of the external sensor 110 stored in the storage device 122. More specifically, for example, the arithmetic device 121 corrects the first detection information of the first sensor 111 among a plurality of pieces of detection information including the first detection information of the first sensor 112 and the second detection information of the second sensor 111.

As described above, the first sensor 111 is, for example, an imaging device such as a stereo camera, and the first detection information is the position and speed of the object detected by the imaging device. In addition, the second sensor 112 is, for example, a millimeter wave radar device, and the second detection information is the position and speed of the object detected by the millimeter wave radar device.

Figure 3:
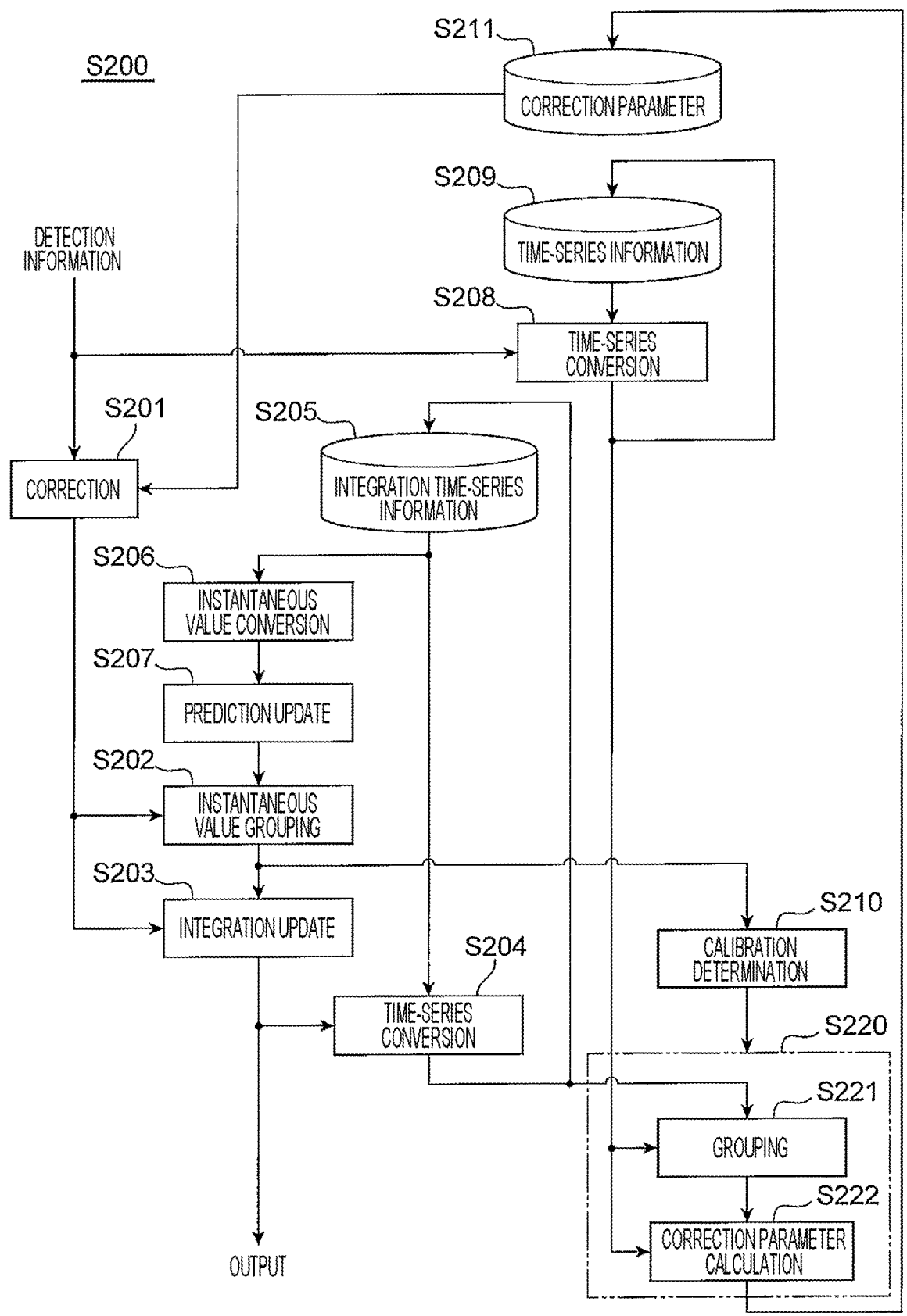
FIG. 3 is a flowchart of detection information integration included in processing of the information integration device illustrated in FIG. 2.
Figure 4:
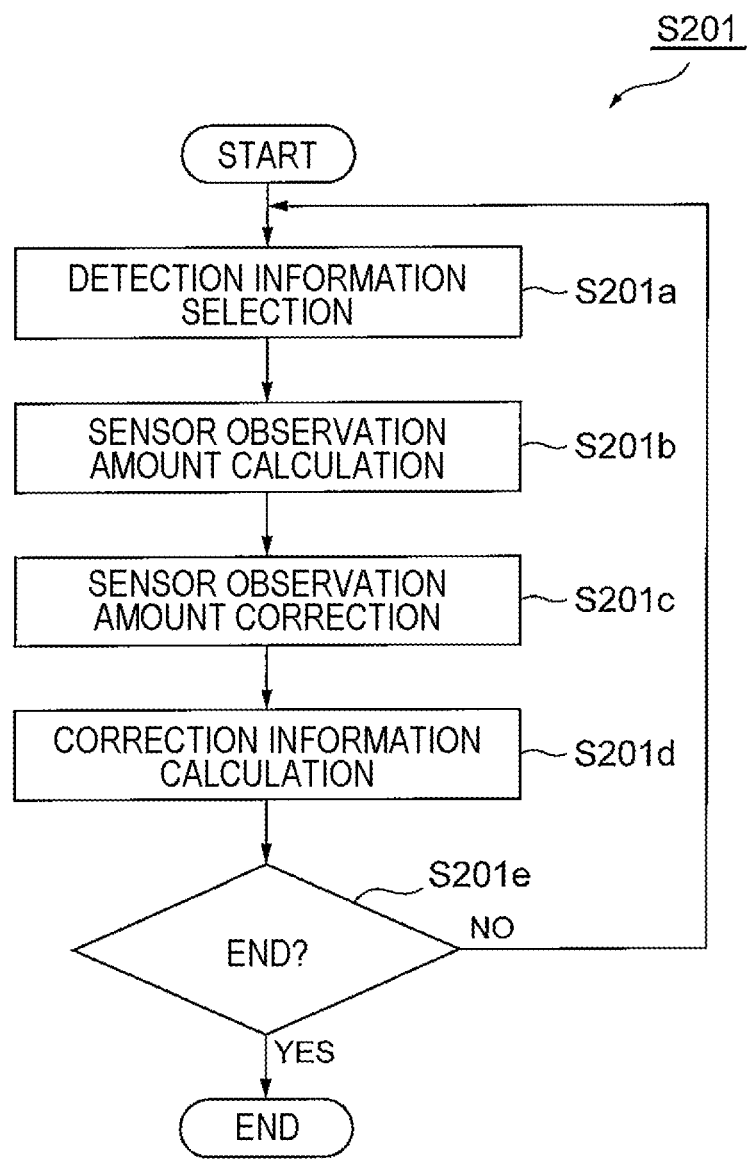
FIG. 4 is a flowchart of correction included in the detection information integration illustrated in FIG. 3.

FIG. 4 is a flowchart of the correction 3201 included in the detection information integration S200 in FIG. 3. The correction 3201 includes, for example, detection information selection S201a, sensor observation amount calculation S201b, sensor observation amount correction S201c, correction information calculation S201d, and end determination S201e.

In the detection information selection S201a, the arithmetic device 121 selects detection information of one sensor among the plurality of sensors of the external sensor 110. More specifically, the arithmetic device 121 selects, for example, the first detection information of the first sensor 111 in the detection information selection S201a. Next, in the sensor observation amount calculation S201b, the arithmetic device 121 calculates an observation amount of the selected one sensor from the detection information of the sensor. Next, in the sensor observation amount correction S201c, the arithmetic device 121 corrects an observation amount of the sensor using a correction parameter acquired from the storage device 122. Next, in the correction information calculation S201d, the arithmetic device 121 calculates correction information that is corrected detection information using the observation amount of the sensor after correction.

More specifically, in the sensor observation amount calculation S201b, the arithmetic device 121 calculates a pixel position which is the sensor observation amount from, for example, the position and the speed of the object which is the first detection information of the first sensor 111 which is the imaging element. Next, in the sensor observation amount correction S201c, the arithmetic device 121 corrects the pixel position, which is the observation amount of the first sensor 111 as the imaging element, using, for example, the correction parameter acquired from the storage device 122. Next, in the correction information calculation S201d, the arithmetic device 121 calculates, for example, the position and speed of the object based on the corrected pixel position as the correction information. Note that the observation amount of the second sensor 112, which is, for example, a millimeter wave radar device, is, for example, a distance and an angle from the second sensor 112 to an object.

After the calculation of the correction information of the selected one sensor, the arithmetic device 121 determines whether the calculation of the correction information of all the sensors to be subjected to the calculation of the correction information has been completed in the end determination S201e. When determining that the calculation of the correction information has not been completed for all the sensors for which the correction information is to be calculated (NO), the arithmetic device 121 returns to the detection information selection S201a. When determining that the calculation of the correction information has been completed for all the sensors for which the correction information is to be calculated (YES), the arithmetic device 121 ends the correction S201.

For example, in an initial state, the storage device 122 stores correction parameters at the time of product shipment of a plurality of sensors including the first sensor 111 constituting the external sensor 110 as correction parameters used in the correction S201. The correction parameter stored in the storage device 122 is updated, for example, in a correction parameter storage S211 described below.

After the correction S201 illustrated in FIGS. 3 and 4 ends, the arithmetic device 121 performs the following processing in the instantaneous value grouping S202. The arithmetic device 121 performs instantaneous value grouping using the correction information calculated for the target sensor in the correction S201 and the detection information from the sensor that is not the target of the correction S201 among the plurality of sensors constituting the external sensor 110. As a result, the arithmetic device 121 outputs integrated detection information of the same object detected by the plurality of sensors constituting the external sensor 110.

More specifically, in the instantaneous value grouping S202, the arithmetic device 121 performs the instantaneous value grouping by using, for example, correction information obtained by correcting the first detection information of the first sensor 111 that is an imaging device and, for example, second detection information of the second sensor 112 that is a millimeter wave radar device. Here, the instantaneous value grouping uses a method different from the time-series grouping based on the time-series information of the detection information and the correction information of the sensor, that is, the temporal transition of the detection information and the correction information. In the instantaneous value grouping, the detection information and the correction information of the plurality of sensors are grouped using the instantaneous value of the detection information of the sensor, that is, the detection information acquired in one sampling and the correction information thereof.

The arithmetic device 121 performs the instantaneous value grouping of the detection information and the correction information of the plurality of sensors constituting the external sensor 110 using, for example, the following Equation (1) stored in the storage device 122. Equation (1) represents a Mahalanobis distance. In the instantaneous value grouping S202, the arithmetic device 121 uses, for example, the detection information of the plurality of sensors constituting the external sensor 110 and the prediction information of the correction information. This prediction information is calculated in the prediction update S207 of the integrated detection information described below.

[Equation 1]

$$(x_{p,i,t} - x_{s,j,t})^t p_{p,i,t,s,j,t}^{-1} (x_{p,i,t} - x_{s,j,t}) \quad (1)$$

In Equation (1), $x_{s,j,t}$ is, for example, the detection information or correction information, and $x_{p,i,t}$ is the prediction information of the detection information and the correction information. For example, it is assumed that the detection information or the correction information follows a normal distribution in which the prediction value is an average, and information that the covariance is $P_{p,i,t,s,j,t}$ is obtained. Note that a subscript p represents prediction, s represents a sensor, i represents an identification number of a prediction value, j represents an identification number of detection information or correction information, and t represents a time point.

In this case, the Mahalanobis distance between the detection information and the correction information and their predicted values is expressed by the above Equation (1). In the instantaneous value grouping S202, for example, in a case where the Mahalanobis distance is equal to or less than a threshold, the arithmetic device 121 sets the detection information or the correction information of the plurality of sensors as a grouping target. Then, the arithmetic device 121 stores the respective predicted values of the detection information and the correction information, and the identification numbers of the detection information or the correction information of the plurality of sensors to be grouped in the storage device 122.

After completion of the instantaneous value grouping S202, the arithmetic device 121 outputs the integrated detection information in the integration update S203 based on, for example, the detection information and the correction information of the plurality of sensors constituting the external sensor 110 and the identification number of the detection information or the correction information of the grouping target. This integrated detection information is, for example, information obtained by estimating a state of an object detected by the plurality of sensors constituting the external sensor 110. Using the integrated detection information output in the integration update S203, the arithmetic device 121 outputs the environment information as described above in the environmental information integration S300 illustrated in FIG. 2.

In addition, in the time-series conversion S204 of the integrated detection information illustrated in FIG. 3, the arithmetic device 121 adds the latest integrated detection information output in the integration update S203 to the integrated time-series information which is the time series of the past integrated detection information stored in the storage device 122. Then, the arithmetic device 121 outputs the latest integrated time-series information to which the latest integrated detection information is added. In addition, the arithmetic device 121 stores the latest integrated time-series information in the storage device 122 in the storage of the integrated time-series information S205.

In addition, for example, the arithmetic device 121 converts the integrated time-series information stored in the storage device 122 into an instantaneous value in the instantaneous value conversion S206 of the integrated time-series information, and outputs the prediction information using the integrated detection information converted into the instantaneous value in the prediction update S207 of the integrated detection information. This prediction information is, for example, a result of predicting the state of the object detected by the plurality of sensors constituting the external sensor 110 after the time corresponding to the time interval at which the sensor fusion is performed has elapsed. This prediction information is used, for example, in the instantaneous value grouping S202 as described above.

In addition, the storage device 122 stores, for example, time-series information that is a time series of past detection information of a plurality of sensors constituting the external sensor 110. In the time-series conversion S208 of the detection information, the arithmetic device 121 outputs the latest time-series information obtained by adding the latest detection information of the plurality of sensors constituting the external sensor 110 to the time-series information stored in the storage device 122, for example. Further, the arithmetic device 121 stores the latest time-series information in the storage device 122 in the storage S209 of the time-series information.

In addition, in the calibration determination S210, the arithmetic device 121 determines the necessity of calibration of at least one of the plurality of sensors constituting the external sensor 110. In the calibration determination S210, for example, the arithmetic device 121 calculates a calibration determination index based on the instability of the instantaneous value grouping S202 and calculates the correction parameter in the calibration S220 when the calibration determination index becomes equal to or greater than the threshold. For example, the calibration determination index is obtained by integrating an index indicating the instability of the instantaneous value grouping S202 with time.

That is, for example, in a normal state in which the calibration determination index in the calibration determination S210 is equal to or less than the threshold, the arithmetic device 121 repeats the processing from the correction S201 to the calibration determination S210 in a predetermined cycle. Then, for example, the arithmetic device 121 calculates the correction parameter in the calibration S220 only in an abnormal state where the calibration determination index in the calibration determination S210 exceeds the threshold. The calibration S220 includes, for example, grouping S221 and correction parameter calculation S222.

The calibration determination index can be, for example, a variable with an initial value of zero. In this case, for example, the arithmetic device 121 adds 1 to the calibration determination index for each processing and stores the result in the storage device 122. For example, in the calibration determination S210, the arithmetic device 121 outputs binary information indicating whether the calibration determination index is a predetermined threshold or more. For example, when the binary information of the calibration determination index is true, that is, when the calibration determination index is greater than or equal to a predetermined threshold, the arithmetic device 121 initializes the calibration determination index and stores the calibration determination index as 0 in the storage device 122.

When determining that the sensor needs to be calibrated in the calibration determination S210, the arithmetic device 121 starts, for example, the time-series grouping in the grouping S221. In the example illustrated in FIG. 3, the arithmetic device 121 uses the following two pieces of information as inputs of time-series grouping. One is the time series, that is, the time-series information of the detection information of the plurality of sensors output in the time-series conversion S208 of the detection information.

The other is the integrated time-series information output in the time-series conversion S204 of the integrated detection information. In the grouping S221, the arithmetic device 121 estimates information in which the same object is detected among the time-series information of the plurality of sensors using these two pieces of information, integrates the pieces of information, and outputs the integrated time-series information.

In this grouping S221, the arithmetic device 121 performs time-series grouping of the time-series information of the plurality of sensors by using, for example, the above Equation (1) and the following Equation (2) stored in the storage device 122. Equation (2) represents a time average Mahalanobis distance. The time average Mahalanobis distance is, for example, a distance between time-series information of a plurality of sensors and integrated time-series information including prediction information. At this time, the time average Mahalanobis distance is obtained by averaging the Mahalanobis distance of the above Equation (1) in a common time range from t=t1 to t=t2 in which detection information of two objects existed.

[Equation 2]

$$\frac{1}{t_2 - t_1 + 1} \sum_{t=t_1}^{t_2} (x_{p,i,t} - x_{s,j,t})^t P_{p,i,t,s,j,t}^{-1} (x_{p,i,t} - x_{s,j,t}) \qquad (2)$$

In the grouping S221, for example, in a case where the time average Mahalanobis distance in the above Equation (2) is equal to or less than the threshold, the arithmetic device 121 groups the time-series information of the sensor output in the time-series conversion S208 of the detection information and the integrated time-series information output in the time-series conversion S204 of the integrated detection information. Then, the arithmetic device 121 stores the identification number of the time-series information of the sensor grouped in the integrated time-series information in the storage device 122.

Figure 5:
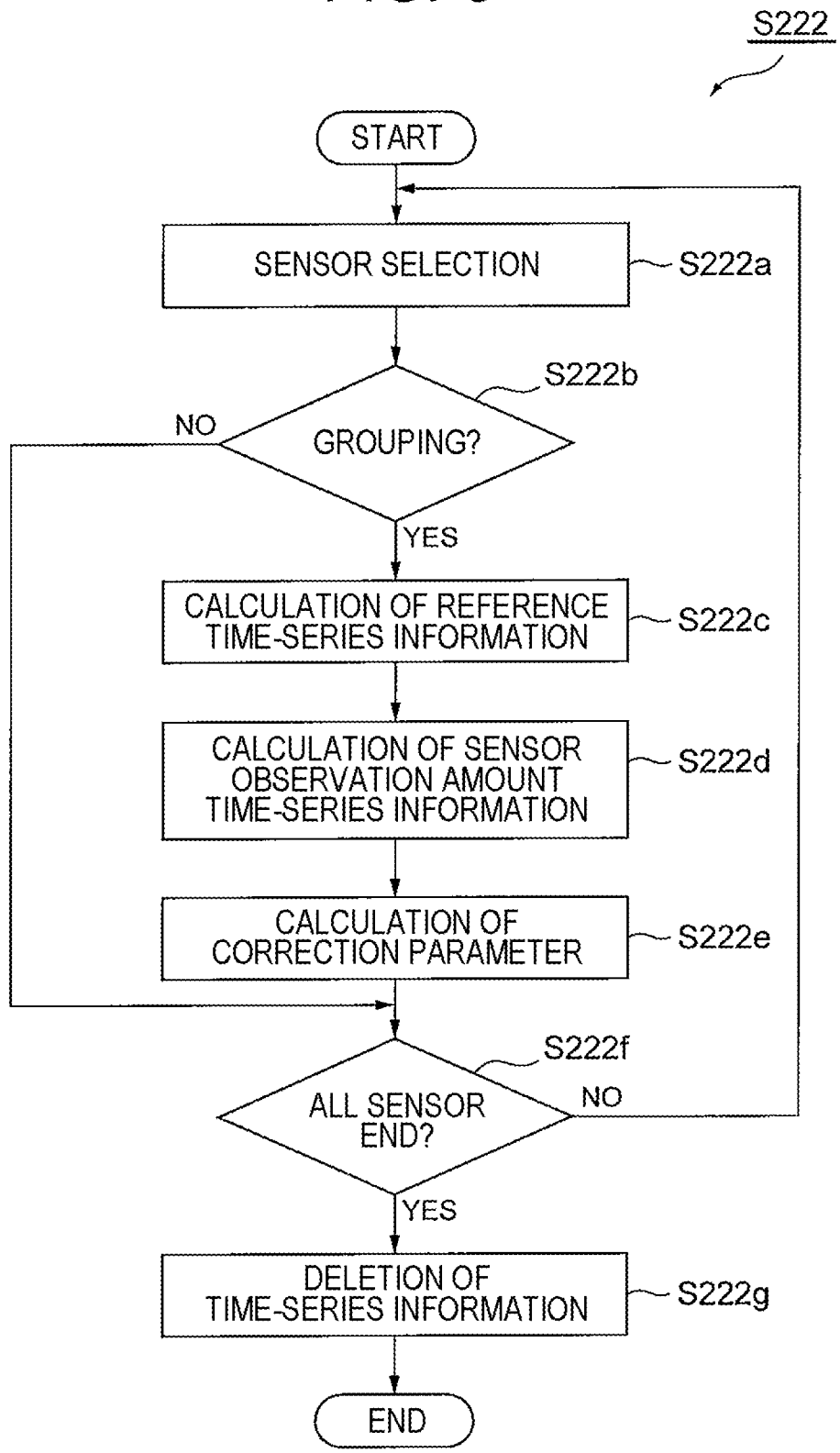
FIG. 5 is a flowchart of correction parameter calculation included in the detection information integration illustrated in FIG. 3.

FIG. 5 is a flowchart illustrating an example of the correction parameter calculation S222 included in the detection information integration S200 in FIG. 3. The correction parameter calculation S222 includes, for example, sensor selection S222a, grouping determination S222b, calculation S222c of reference time-series information, calculation S222d of sensor observation amount time-series information, calculation S222e of a correction parameter, end determination S222f, and deletion S222g of time-series information.

In the sensor selection S222a, the arithmetic device 121 selects, for example, a sensor to be a target for calculating the correction parameter from among the plurality of sensors constituting the external sensor 110. More specifically, the arithmetic device 121 selects the first sensor 111, which is the imaging sensor, for example, in the sensor selection S222a. Next, in the grouping determination S222b, the arithmetic device 121 determines whether the time-series information of the grouped detection information exists in the integrated time-series information for the selected sensor.

In the grouping determination S222b, when the time-series information of the detection information grouped in the integrated time-series information does not exist (NO), the arithmetic device 121 proceeds to the end determination S222f described below. In addition, in the grouping determination S222b, when the time-series information of the detection information grouped in the integrated time-series information exists (YES), the arithmetic device 121 proceeds to the reference time-series information calculation S222c. More specifically, in the grouping determination S222b, the arithmetic device 121 determines whether the time-series information of the detection information grouped in the integrated time-series information exists for the selected first sensor 111.

In the calculation S222c of the reference time-series information, the arithmetic device 121 calculates the time-series information of the observation amount of the sensor serving as the reference of the correction for the selected sensor as the reference time-series information. More specifically, in the calculation S222c of the reference time-series information, the arithmetic device 121 calculates the time-series information of the pixel position serving as the reference of the correction as the reference time-series information on the basis of the integrated time-series information for the first sensor 111 which is the selected imaging device.

In the calculation S222d of the sensor observation amount time-series information, the arithmetic device 121 calculates the time-series information of the observation amount of the sensor as the sensor observation amount time-series information on the basis of the time-series information which is the time series of the detection information for the selected sensor. More specifically, in the calculation S222d of the sensor observation amount time-series information, the arithmetic device 121 calculates the time-series information of the pixel position to be corrected as the sensor observation amount time-series information on the basis of the time-series information for the first sensor 111 which is the selected imaging device.

In the calculation S222e of the correction parameter, the arithmetic device 121 calculates an average of differences between the reference time-series information and the sensor observation amount time-series information at each time point for the selected sensor, and stores the average of the differences in the storage device 122 as the correction parameter. More specifically, in the calculation S222e of the correction parameter, the arithmetic device 121 calculates an average of differences between the pixel positions at each time point of the reference time-series information and the sensor observation amount time-series information for the first sensor 111 that is the selected imaging element, and stores the average of the differences between the pixel positions in the storage device 122 as the correction parameter.

In the end determination S222f, the arithmetic device 121 determines whether the calculation of the correction parameters has been completed for all the sensors to be selected among the plurality of sensors constituting the external sensor 110. When the calculation of the correction parameters has not been completed for all the sensors to be selected (NO), the arithmetic device 121 returns to the sensor selection S222a, and when the calculation of the correction parameters has been completed for all the sensors to be selected (YES), the arithmetic device 121 proceeds to the deletion S222g of the time-series information.

In the deletion S222g of the time-series information, the arithmetic device 121 deletes the time-series information before the predetermined time among the time-series information of the sensor stored in the storage device 122 in the storage S209 of the time-series information, and ends the calculation S222 of the correction parameter. Thereafter, in the storage S211 of the correction parameter illustrated in FIG. 3, the arithmetic device 121 stores the correction parameter calculated in the calculation S222e of the correction parameter in the storage device 122.

Figure 6:
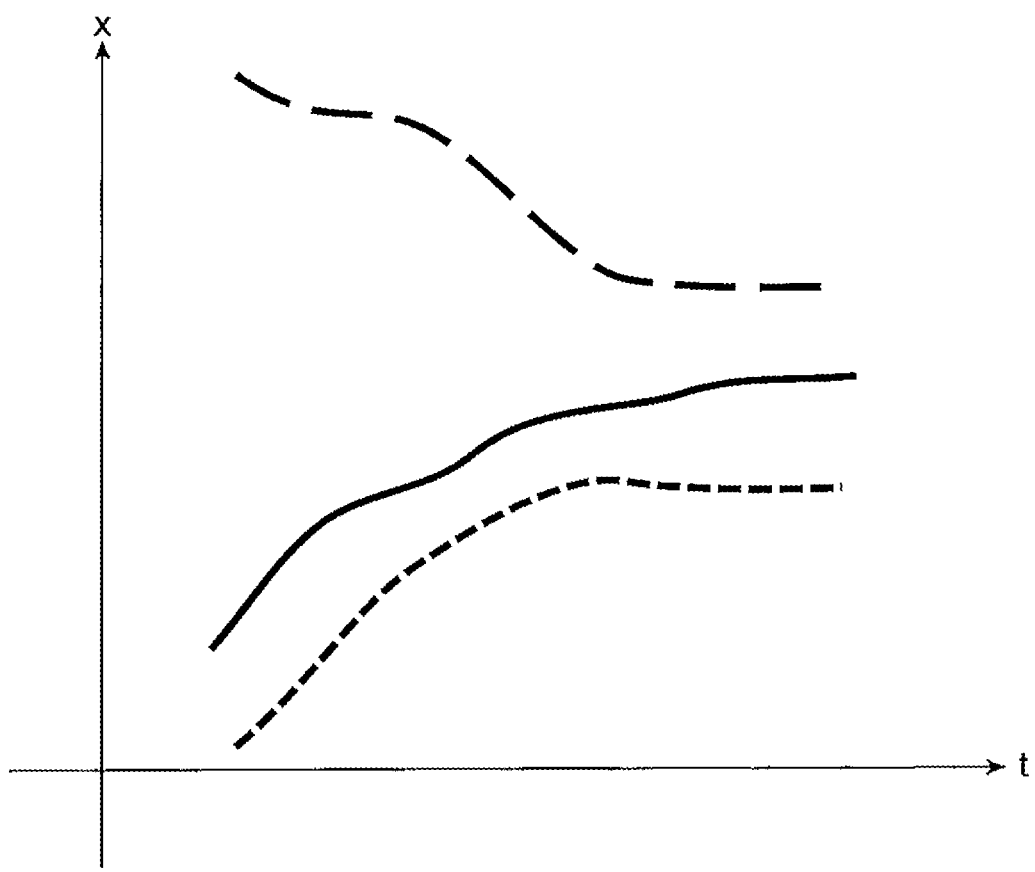
FIG. 6 is a graph illustrating an example of time-series information of an external sensor of the vehicle control system of FIG. 1.
Figure 7A:
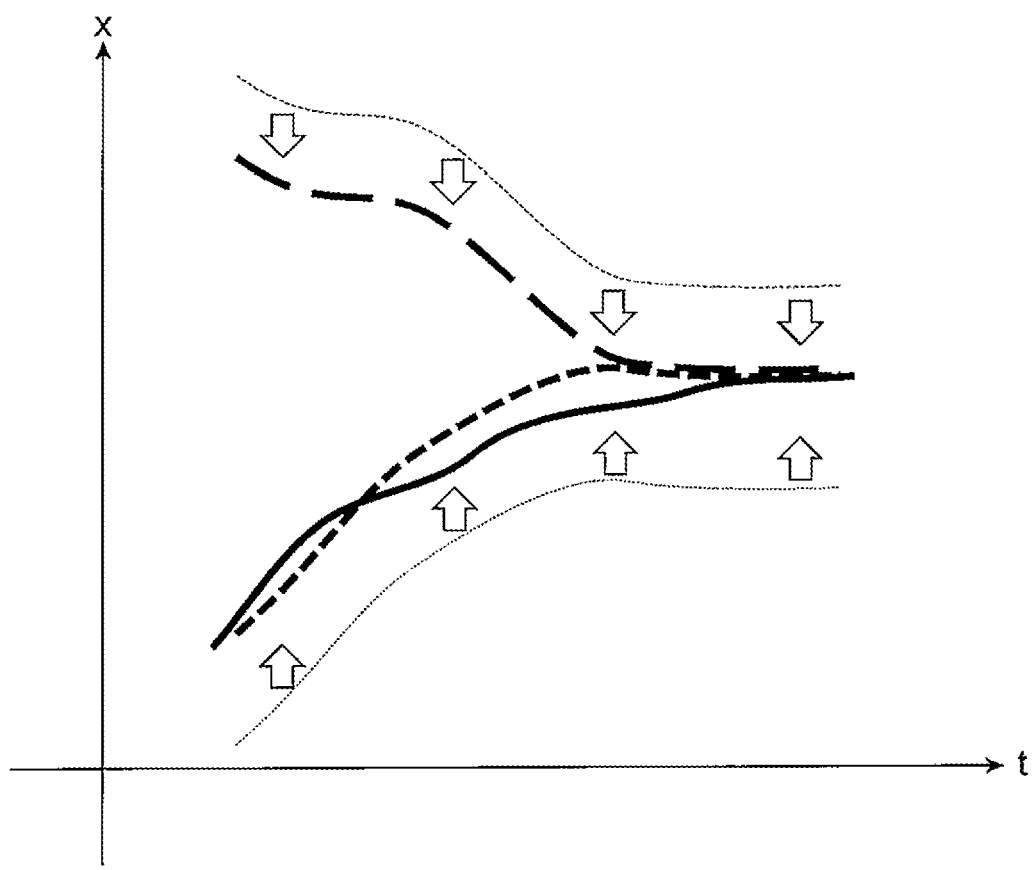
FIG. 7A is a graph showing a grouping result of the conventional obstacle detection device.
Figure 7B:
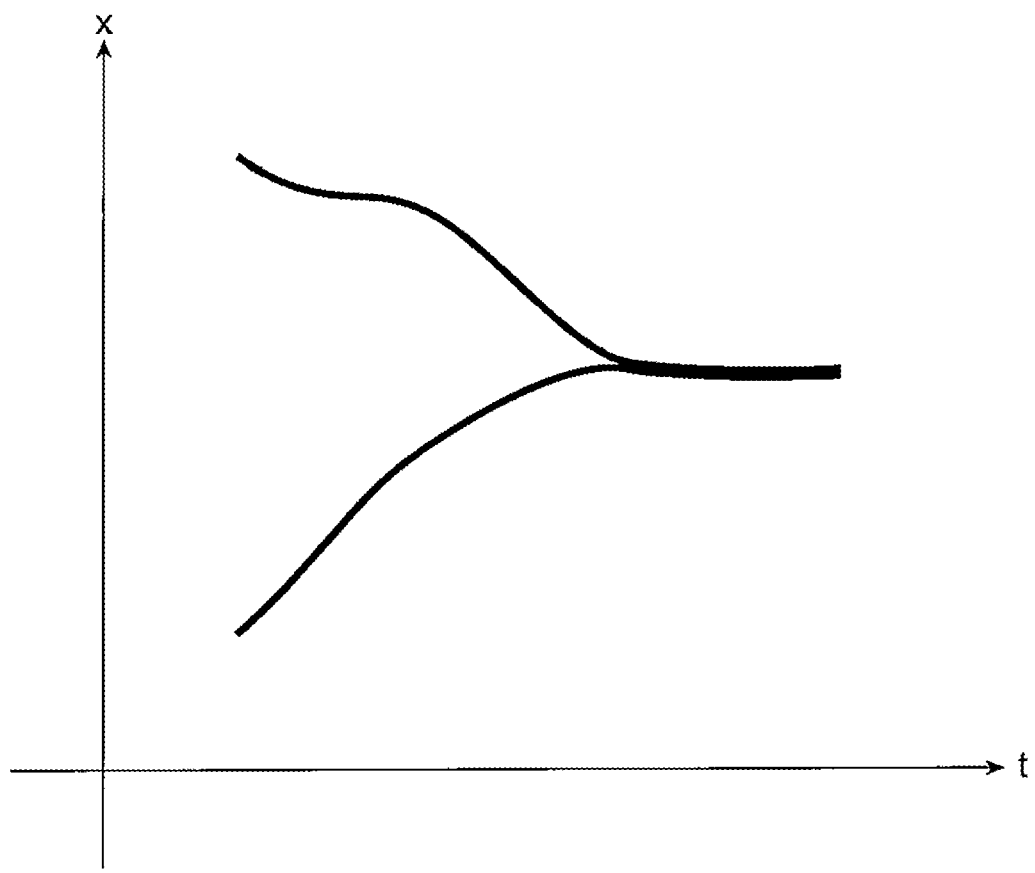
FIG. 7B is a graph showing a grouping result of the conventional obstacle detection device.
Figure 8A:
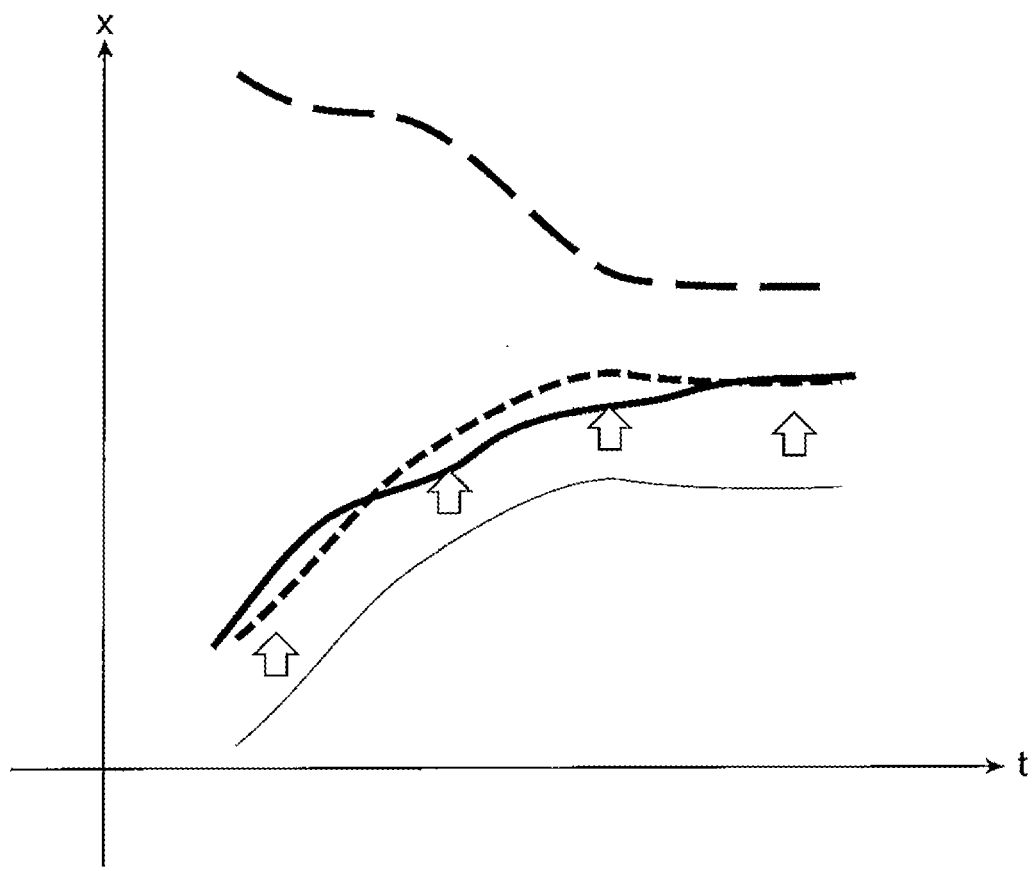
FIG. 8A is a graph showing a grouping result of an information integration device of the vehicle control system of FIG. 1.
Figure 8B:
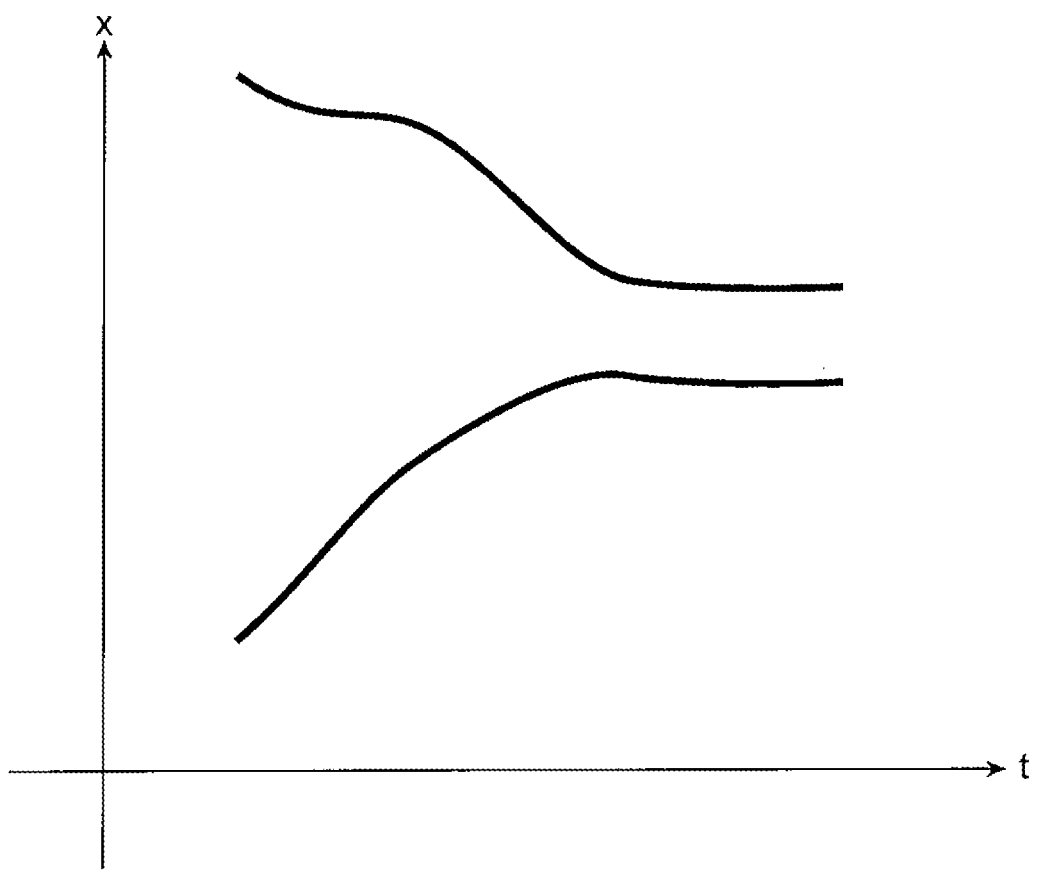
FIG. 8B is a graph showing the grouping result of the information integration device of the vehicle control system of FIG. 1.

Hereinafter, the operation of the vehicle control system 100 of the present embodiment will be described on the basis of comparison with the prior art. FIG. 6 is a graph illustrating an example of time-series information of a plurality of sensors included in the external sensor 110 of the vehicle control system 100 of FIG. 1. FIGS. 7A and 7B are graphs illustrating grouping results of the conventional obstacle detection devices. FIGS. 8A and 8B are graphs illustrating grouping results by the information integration device 120 of the vehicle control system 100 in FIG. 1.

In each graph, a horizontal axis t represents time, and a vertical axis x represents detection information such as a distance and an angle of an object detected by a sensor, for example. Further, in each graph, a solid line and a dotted line are, for example, time-series information of detection information of the same object detected by different types of sensors, and a broken line is time-series information of detection information of another object detected by a different type of sensor from these sensors.

The vehicle control system 100 performs sensor recognition integration that integrates information on objects detected by a plurality of different types of sensors of the external sensor 110, for example, for external sensing of an automobile that performs the AD. In the AD, a travel plan is prepared and a travel determination is made based on a result of recognition of an object around the vehicle by a sensor. There are various sensors for detecting an object, such as a radar, a camera, a sonar, and a laser radar.

These sensors have various conditions such as a detection range, a detectable object, detection accuracy, and cost. Therefore, it is necessary to combine a plurality of sensors according to a purpose. When a plurality of sensors is combined, a plurality of pieces of information detecting the same object may be generated. It is required to determine that these pieces of detection information are information on the same object, integrate them, and output high-accuracy integrated detection information. In this manner, identifying detection information of the same object among detection information of a plurality of sensors is referred to as grouping.

As described above, the conventional obstacle detection device determines that the two obstacles are the same obstacle when the obstacle position detected by the first measurement device and the obstacle position detected by the second measurement device overlap each other at each time of t, t+1, t+2, . . . , and t+n with respect to the plurality of pieces of time-series information as illustrated in FIG. 6. The observation parameter of the sensor may change over time due to the influence of vibration or thermal stress, for example.

Therefore, for example, when the observation parameter of the sensor changes with time, in the instantaneous value grouping of the conventional obstacle detection device that determines whether or not the obstacles detected by the plurality of measurement devices are the same at each time, there is a possibility that an error is included in the determination result. Specifically, for example, as illustrated in FIGS. 7A and 7B, there is a possibility that the pieces of detection information of a plurality of different objects are grouped as detection information of the same object, and high-accuracy grouping is difficult. When the sensors are calibrated in a situation where an error occurs in grouping as described above, there is a concern that the calibration accuracy of the sensors may be deteriorated.

Furthermore, in the above-described conventional action recognition device, grouping with higher accuracy than the instantaneous value grouping can be performed by time-series grouping based on temporal transition of a plurality of pieces of sensor data. However, in this conventional action recognition device, since the sensor is not calibrated, an error in the detection information of the object detected by each sensor cannot be removed. Therefore, in the conventional obstacle detection device, it is conceivable to calibrate the sensor by time-series grouping instead of the instantaneous value grouping. However, since the time-series grouping requires the time-series information, it takes a longer time than the instantaneous value grouping that does not require time-series data.

In order to solve such a problem of the related art, the vehicle control system 100 of the present embodiment includes the first sensor 111 and the second sensor 112 constituting the external sensor 110, the information integration device 120, and the vehicle control device 130. The first sensor 111 and the second sensor 112 detect an object around the vehicle. The information integration device 120 groups the first detection information and the second detection information, which are the detection results of the first sensor 111 and the second sensor 112 that have detected the same object, and outputs integrated detection information. The vehicle control device 130 controls the vehicle based on the integrated detection information. The information integration device 120 includes the arithmetic device 121 and the storage device 122. The arithmetic device 121 stores, in the storage device 122, first time-series information which is the time-series information of the first detection information and the second time-series information which is the time-series information of the second detection information in the storage S209 of the time-series information illustrated in FIG. 3. In addition, in the calibration S220 illustrated in FIG. 3, the arithmetic device 121 groups the first time-series information and the second time-series information when the first sensor 111 and the second sensor 112 detect the same object to calculate the correction parameter of the first detection information. Moreover, the arithmetic device 121 calculates correction information in which the first detection information is corrected using the correction parameter in the correction S201 in FIG. 3. Then, the arithmetic device 121 outputs the integrated detection information by the instantaneous value grouping using the correction information and the second detection information in the instantaneous value grouping S202 and the integration update S203 illustrated in FIG. 3.

With this configuration, the vehicle control system 100 of the present embodiment can perform the instantaneous value grouping S202 by the information integration device 120 using the correction information obtained by correcting the first detection information of the first sensor 111 during normal driving. In other words, the vehicle control system 100 of the present exemplary embodiment can perform the calibration S220 only when the arithmetic device 121 of the information integration device 120 determines that the calibration is necessary in the calibration determination S210, and can perform the time-series grouping in the grouping S221. That is, since the vehicle control system 100 does not execute time-series grouping during normal driving, it is not necessary to wait for the time-series information of the detection information of the sensor to be prepared.

As a result, during the normal operation, the processing time for grouping the detection information of the plurality of sensors included in the external sensor 110, for example, the first sensor 111 and the second sensor 112 can be shortened as compared with the time-series grouping. In addition, when the arithmetic device 121 determines that calibration is necessary, the correction parameter of the first detection information of the first sensor 111 is calculated using the time-series information of the first detection information, and thus, the correction information of the first detection information can be accurately calculated regardless of a temporal change in the observation parameter of the first sensor 111. By using this correction information, as illustrated in FIGS. 8A and 8B, it is possible to prevent detection information of a plurality of different objects from being grouped as detection information of the same object, and to perform the grouping with high accuracy as compared with the conventional obstacle detection device.

In addition, in the vehicle control system 100 of the present embodiment, the arithmetic device 121 of the information integration device 120 repeats the output of the integrated detection information at a predetermined cycle in the integration update S203, for example, as illustrated in FIG. 3. Moreover, the arithmetic device 121 stores the integrated time-series information, which is the time-series information of the integrated detection information, in the storage device 122 in the time-series conversion S204 of the integrated detection information and the storage 3205 of the integrated time-series information.

With this configuration, the vehicle control system 100 of the present embodiment can perform the grouping S221 using the integrated time-series information stored in the storage device 122 when performing the calibration S220 by the arithmetic device 121 of the information integration device 120. Therefore, in the grouping S221, the grouping S221 can be performed using the integrated time-series information stored in the storage device 122 without waiting for the integrated detection information to be prepared. Furthermore, the arithmetic device 121 can calculate the detection information and the prediction information of the correction information of the plurality of sensors constituting the external sensor 110 in the prediction update S207 of the integrated detection information, and can perform the instantaneous value grouping using the prediction information in the instantaneous value grouping S202. As a result, the instantaneous value grouping S202 can be performed more easily and with high accuracy.

In addition, in the vehicle control system 100 of the present embodiment, the arithmetic device 121 of the information integration device 120 calculates the calibration determination index based on the instability of the instantaneous value grouping, for example, in the calibration determination S210 illustrated in FIG. 3. Then, when the calibration determination index becomes equal to or greater than the threshold, the arithmetic device 121 performs the calibration S220 to calculate the correction parameter.

With this configuration, the vehicle control system 100 of the present embodiment can detect a temporal change in the observation parameter of the sensor included in the external sensor 110 such as the first sensor 111 on the basis of the calibration determination index by the arithmetic device 121 of the information integration device 120. Accordingly, the correction parameter can be automatically updated according to the temporal change of the observation parameter of the sensor, and the instantaneous value grouping S202 by the arithmetic device 121 can be performed with higher accuracy.

In addition, in the vehicle control system 100 of the present embodiment, the arithmetic device 121 of the information integration device 120 calculates the correction parameter by grouping based on the temporal transition of the first time-series information of the first sensor 111 and the temporal transition of the second time-series information of the second sensor 112.

More specifically, as illustrated in FIG. 3, in grouping S221, the arithmetic device 121 performs the time-series grouping illustrated in FIGS. 8A and 8B using the time-series information that is the time series of the detection information of the plurality of sensors output in the time-series conversion S208 of the detection information. Then, the arithmetic device 121 calculates the correction parameter in the correction parameter calculation S222 illustrated in FIG. 5. With this configuration, a more accurate correction parameter can be calculated, and the arithmetic device 121 can perform the instantaneous value grouping S202 with higher accuracy.

As described above, according to the present embodiment, it is possible to provide the vehicle control system 100 capable of grouping the plurality of detection results of the same object detected by the plurality of sensors with high accuracy in a short time.

Second Embodiment

Next, a vehicle control system 100 according to a second embodiment of the present disclosure will be described with reference to FIGS. 1 to 8 of the first embodiment described above and FIG. 9. A vehicle control system 100 of the present embodiment is different from that of the first embodiment in a configuration of an information integration device 120. Since the other points of the vehicle control system 100 of the present embodiment are the same as those of the vehicle control system 100 according to the first embodiment, the same reference numerals are given to the same parts and descriptions thereof will be omitted.

In the vehicle control system 100 of the present embodiment, the arithmetic device 121 of the information integration device 120 has the following features. When the result of the instantaneous value grouping S202 using the latest correction information of the first sensor 111 and the second detection information of the second sensor 112 is different from the result of the instantaneous value grouping S202 using the past correction information and the second detection information, the arithmetic device 121 calculates the calibration determination index on the basis of the number of pieces of different information between the result of the latest instantaneous value grouping S202 and the result of the past instantaneous value grouping S202. Then, the arithmetic device 121 calculates the correction parameter when the calibration determination index becomes equal to or greater than the threshold.

Figure 9:
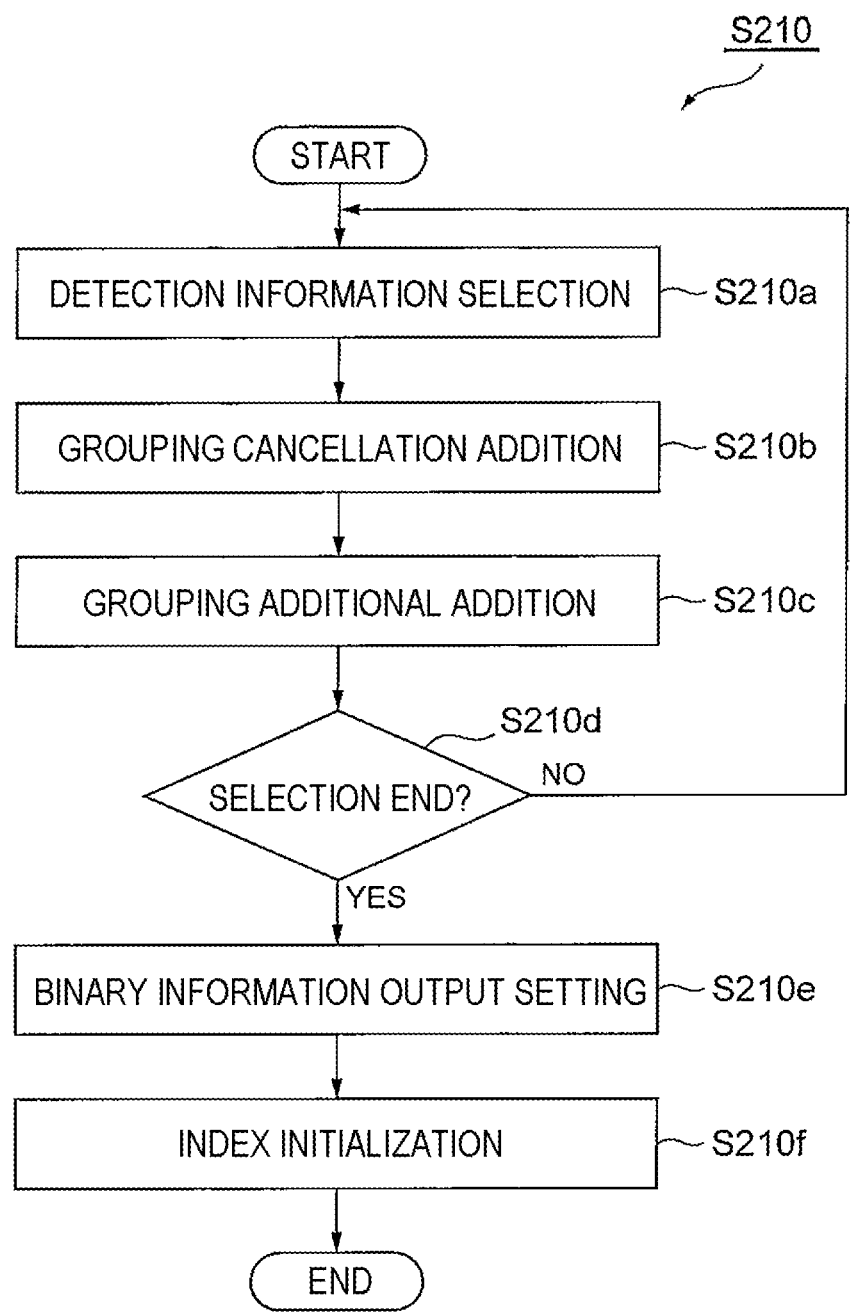
FIG. 9 is a flowchart of calibration determination by a vehicle control system according to a second embodiment of the present disclosure.

FIG. 9 is a flowchart of the calibration determination S210 by the arithmetic device 121 of the present embodiment. The calibration determination S210 includes, for example, detection information selection S210a, grouping cancellation addition S210b, grouping additional addition S210c, selection end determination S210d, binary information output setting S210e, and index initialization S210f.

In the detection information selection S210a, the arithmetic device 121 selects one of the integrated detection information grouped in the previous and latest instantaneous value grouping S202. In the grouping cancellation addition S210b, the arithmetic device 121 adds, to the calibration determination index, the number of pieces of detection information excluded from the target of grouping in the latest instantaneous value grouping S202 among the latest detection information of the plurality of sensors integrated into one piece of integrated detection information in the previous instantaneous value grouping S202.

In the grouping additional addition S210c, the arithmetic device 121 adds the number of pieces of detection information to be grouped in the latest instantaneous value grouping S202 among the latest detection information of the plurality of sensors that have not been grouped in the previous instantaneous value grouping S202 to the calibration determination index. In the selection end determination S210d, the arithmetic device 121 determines whether all the pieces of integrated detection information grouped in the previous and latest instantaneous value grouping S202 have been selected.

In the selection end determination S210d, when the selection of all the pieces of integrated detection information grouped in the previous and latest instantaneous value grouping S202 is not ended (NO), the arithmetic device 121 returns to the detection information selection S210a. In the selection end determination S210d, when the selection of all the pieces of integrated detection information grouped in the previous and latest instantaneous value grouping S202 is ended (YES), the arithmetic device 121 proceeds to the binary information output setting S210e.

In the binary information output setting S210e, the arithmetic device 121 determines whether or not the calibration determination index is equal to or greater than the threshold, and sets, for example, the binary information of true and false as an output. Specifically, in the binary information output setting S210e, the arithmetic device 121 sets the false as the output in a case where the calibration determination index is less than the threshold, sets the true as the output in a case where the calibration determination index is equal to or greater than the threshold, and proceeds to index initialization S210f. When the true is set as the output in the binary information output setting S210e, the arithmetic device 121 initializes the calibration determination index to 0 in the index initialization S210f, outputs true in the binary information of true and false, and ends the calibration determination S210.

According to the vehicle control system 100 of the present embodiment, when the correction parameter is not appropriate in the information integration device 120, the correction parameter can be updated to an appropriate value earlier than the vehicle control system 100 according to the above-described first embodiment. Meanwhile, when the correction parameter is appropriate in the information integration device 120, the time until the correction parameter is updated can be extended as compared with the vehicle control system 100 according to the above-described first embodiment. As a result, a frequency of the calibration determination S210 by the arithmetic device 121 can be reduced, and a processing time can be reduced.

Third Embodiment

Next, a vehicle control system 100 according to a second embodiment of the present disclosure will be described with reference to FIGS. 1 to 8 of the first embodiment described above and FIG. 10. A vehicle control system 100 of the present embodiment is different from that of the first embodiment in a configuration of an information integration device 120. Since the other points of the vehicle control system 100 of the present embodiment are the same as those of the vehicle control system 100 according to the first embodiment, the same reference numerals are given to the same parts and descriptions thereof will be omitted.

In the vehicle control system 100 of the present embodiment, the arithmetic device 121 of the information integration device 120 calculates the correction parameter by grouping based on a time-series distance of the first time-series information of the first sensor 111 and the second time-series information of the second sensor 112. That is, in the present embodiment, the arithmetic device 121 of the information integration device 120 performs the grouping S221 based on the time-series distance of the first time-series information and the second time-series information instead of the grouping S221 using the temporal transition of the first time-series information and the temporal transition of the second time-series information. In other words, in the present embodiment, in the grouping S221, the arithmetic device 121 integrates the time-series information that is the time series of the detection information of the plurality of sensors by clustering that is one of the unsupervised learning methods.

Figure 10:
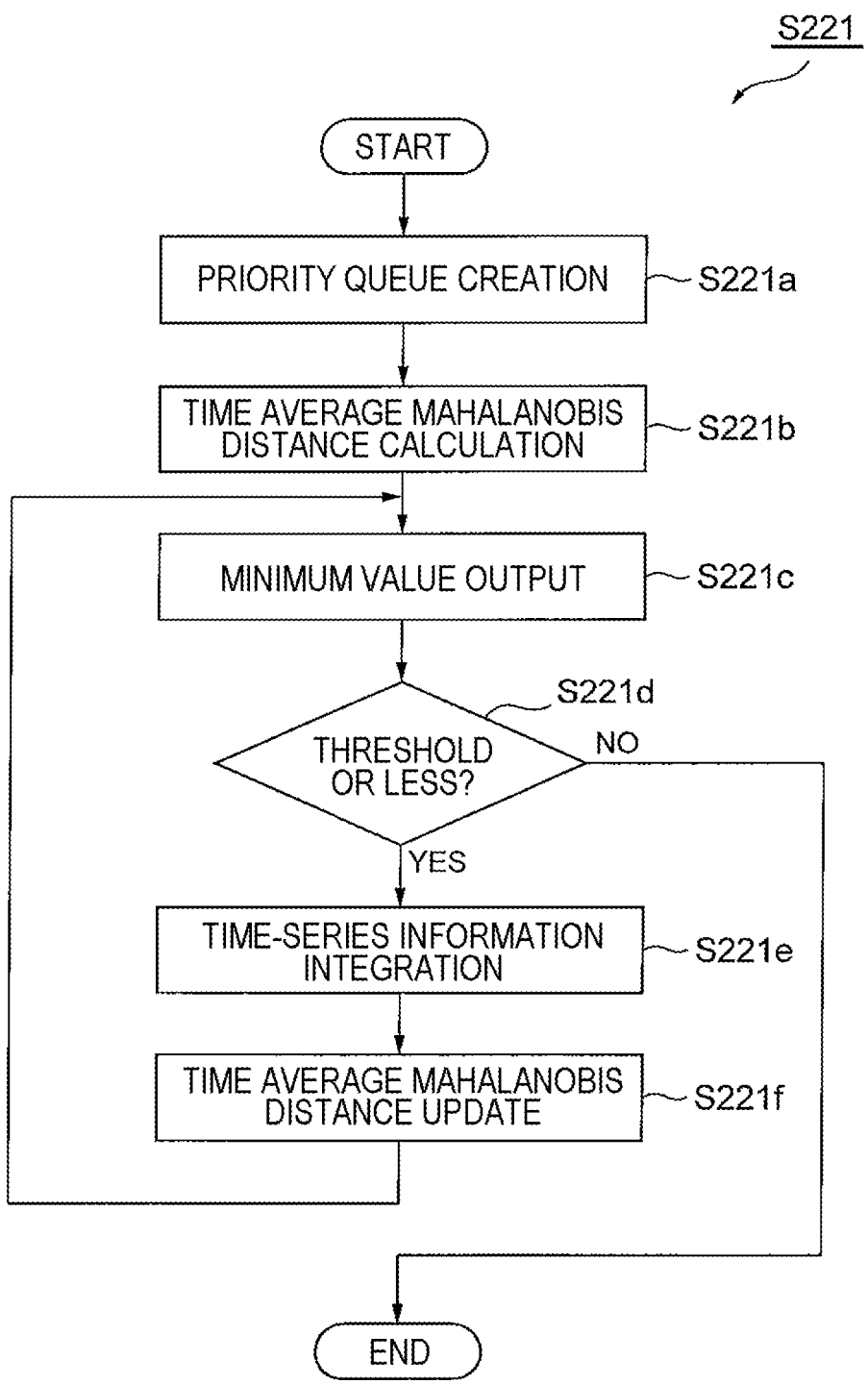
FIG. 10 is a flowchart of grouping of a vehicle control system according to a third embodiment of the present disclosure.

FIG. 10 is a flowchart of the grouping S221 in the calibration S220 by the arithmetic device 121 of the present embodiment. The grouping S221 of the calibration S220 includes, for example, prioritized queue creation S221a, time average Mahalanobis distance calculation S221b, minimum value output S221c, minimum value determination S221d, time-series information integration S221e, and time average Mahalanobis distance update S221f.

In the prioritized queue creation S221a, the arithmetic device 121 creates an empty priority queue in the storage device 122. The prioritized queue is, for example, a collection from which a minimum value can be preferentially retrieved. In the time average Mahalanobis distance calculation S221b, the arithmetic device 121 calculates the time average Mahalanobis distance between the time-series information of the plurality of sensors using the above Equation (2) and adds the time average Mahalanobis distance to the priority queue of the storage device 122.

In the minimum value output S221c, the arithmetic device 121 extracts a combination of the time-series information of the sensor that minimize the time average Mahalanobis distance output from the priority queue. In the minimum value determination S221d, the arithmetic device 121 determines whether or not the time average Mahalanobis distance of the combination of the extracted time-series information is equal to or less than the threshold. In a case where the time average Mahalanobis distance exceeds the threshold in the minimum value determination S221d (NO), the arithmetic device 121 ends the grouping S221. Meanwhile, in a case where the time average Mahalanobis distance is equal to or less than the threshold in minimum value determination S221d (YES), the arithmetic device 121 proceeds to time-series information integration S221e.

In the time-series information integration S221e, the arithmetic device 121 integrates the time-series information of the sensor whose time average Mahalanobis distance is equal to or less than the threshold. In the time average Mahalanobis distance update S221f, the arithmetic device 121 updates the time average Mahalanobis distance between the time-series information of the plurality of sensors. Further, the arithmetic device 121 deletes the time average Mahalanobis distance related to the combination of the time-series information of the sensors before the integration from the priority queue, adds the time average Mahalanobis distance related to the time-series information after the integration to the priority queue, and returns to the minimum value output S221c.

According to the vehicle control system 100 of the present embodiment, the integrated time-series information is not used in the grouping S221 of the calibration S220 by the arithmetic device 121 of the information integration device 120. As a result, even when erroneous grouping is performed in the instantaneous value grouping S202, it is possible to prevent an error in the grouping result from being propagated to the storage S205 of the integrated time-series information and the storage S211 of the correction parameter. Therefore, the influence of the error can be eliminated in the correction parameter calculation S222, and the detection information of the sensor can be corrected with high accuracy in the correction S201.

Although the embodiments of the vehicle control system according to the present disclosure have been described in detail with reference to the drawings, the specific configuration is not limited to the embodiments, and even when there are design changes and the like in the range that does not deviate from the gist of this disclosure, these design changes are included in this disclosure.

REFERENCE SIGNS LIST

100 vehicle control system
111 first sensor
112 second sensor
120 information integration device
121 arithmetic device
122 storage device
130 vehicle control device

The invention claimed is:

1. A vehicle control system comprising:
a first sensor and a second sensor that detect an object around a vehicle;
an information integration device that groups first detection information and second detection information that are detection results of the first sensor and the second sensor that detect the object and outputs integrated detection information; and
a vehicle control device that controls the vehicle based on the integrated detection information,
wherein the information integration device includes an arithmetic device and a storage device, and
the arithmetic device stores first time-series information that is time-series information of the first detection information and second time-series information that is time-series information of the second detection information in the storage device,
selects the first sensor to be a target for calculating a correction information,
groups the first time-series information and the second time-series information when a time average Mahalanobis distance of the first time-series and the second time-series satisfies a first threshold, to calculate a correction parameter of the first detection information,
calculates a reference time-series information of a reference pixel of the second sensor,
calculates an observation time-series information of an observation pixel of the first sensor,
calculates the correction information by correcting the first detection information using the correction parameter, the correction parameter determined by calculating an average of differences between the reference pixel in the reference time-series information and the observation pixel in the observation time-series information,
deletes first time-series and a second time-series before a predetermined time, stores the correction parameter, and
outputs the integrated detection information by instantaneous value grouping using the correction information and the second detection information.

2. The vehicle control system according to claim 1,
wherein the arithmetic device repeats the output of the integrated detection information at a predetermined cycle, and stores integrated time-series information that is the time-series information of the integrated detection information in the storage device.

3. The vehicle control system according to claim 2,
wherein the arithmetic device calculates a calibration determination index based on instability of the instantaneous value grouping and calculates the correction parameter when the calibration determination index becomes equal to or greater than a threshold.

4. The vehicle control system according to claim 2,
wherein when a first result of grouping using new correction information and the second detection information is different from a second result of grouping using past correction information and the second detection information, the arithmetic device calculates a calibration determination index on a basis of a number of pieces of different information between the first result and the second result, and when the calibration determination index is equal to or greater than a second threshold, the arithmetic device calculates the correction parameter.

5. The vehicle control system according to claim 2,
wherein the arithmetic device calculates the correction parameter by grouping based on a temporal transition of the first time-series information and a temporal transition of the second time-series information.

6. The vehicle control system according to claim 2,
wherein the arithmetic device calculates the correction parameter by grouping based on a time-series distance of the first time-series information and the second time-series information.

\* \* \* \* \*